June 20, 1967  F. T. PARFREY  3,327,035
METHOD AND MACHINES FOR MAKING BOTTLES
AND OTHER HOLLOW ARTICLES
Filed Sept. 9, 1963  5 Sheets-Sheet 1

INVENTOR.
FRANCIS TRIGG PARFREY

United States Patent Office 3,327,035
Patented June 20, 1967

3,327,035
METHOD AND MACHINES FOR MAKING BOTTLES AND OTHER HOLLOW ARTICLES
Francis Trigg Parfrey, "Wangee," P.O. Box 12,
Metung, Victoria, Australia
Filed Sept. 9, 1963, Ser. No. 307,564
Claims priority, application Australia, Sept. 10, 1962,
21,936/62
16 Claims. (Cl. 264—99)

This invention relates to improvements in machines for making bottles and other hollow articles and it refers particularly to a machine for the blow-moulding of bottles and other hollow ware (hereinafter referred to as "bottles") from synthetic thermoplastic materials, and especially to a machine for moulding plastic bottles and for filling such bottles when moulded.

An important object of the invention is to provide a machine, for blow-moulding bottles, which will be capable of efficient operation at a high rate of output and which may be employed for the filling of the bottles as they are formed.

Another important object is to provide an improved method of blow-moulding plastic bottles incorporating a sequence of operations which will provide for a reduction in lost time in the different steps of the process.

A further object is to provide an improved method of blow-moulding plastic bottles wherein there may be included in the sequence of operations the filling of the bottles after they have been cooled sufficiently after the blow-moulding thereof and the ejection of the filled bottles from the mould or moulds.

Yet another object is to provide a method of and means for forming plastic bottles and filling said bottles prior to ejection from the blow-moulding apparatus so that the one production unit will produce already-filled plastic bottles without it being necessary to first form the bottles in one apparatus and then fill them in another.

In the manufacture of plastic bottles and the filling of such bottles it is generally done to make the bottles in one factory and to then transport them to another factory at which the bottles are filled. In very many cases that transport of the empty bottles may be over large distances as bottle making machines are capable of very high rates of output such that it is not economical to have the bottle making machines in the same cities where they are to be filled. The storage and transport of the empty bottles creates many problems, due largely to the bulk or space occupied by the bottles. Thus, the empty bottles are generally stored for a time at the factory where they are made, then transported to the filling factory where they are probably stored again until required for use. Obviously, if the bottles could be filled as soon as they are made the storage of the empty bottles, generally at two different locations, will be eliminated and, also, it will not be necessary to transport the bottles from one location to another.

It is considered that it would probably be far better to either form the bottles at the location where the liquid contents thereof are prepared or to transport such liquid contents in bulk to the location at which the bottles are being made and to fill the bottles with that liquid at that location, the distribution being effected from the bottle-filling location.

Accordingly, it is an object of the invention to provide means whereby the storing of empty bottles prior to use may be substantially reduced or in many cases eliminated.

It is also to be appreciated that a machine which may be used to both form plastic bottles and fill such bottles at a high rate may be capable of exceeding the demand for filled bottles of a particular type, or bottles filled with a particular liquid content. As it is undesirable for such a machine to be idle when not required to produce filled bottles it is an object of the invention to provide a machine which may be used for producing and filling plastic bottles at a high rate of production and which also may be used for producing plastic bottles at a high rate, and wherein the lost motion or wasted time in the production of the bottles will be reduced to a minimum.

Another object is to provide a method for making plastic bottles which will be sufficiently flexible as to permit the incorporation, as and when desired, of the step of filling the bottles produced.

According to this invention there is provided a method of making plastic bottles wherein the sequence of operations is such that when so derived provision may be made for the filling of the formed and cooled bottle without removal thereof from the mould or die.

The sequence of operations is such that a bottle is moulded to shape, as by blow-moulding, cooled, filled and then the filled bottle is ejected from the mould which then returns to the moulding position. It is preferred that the bottle be blow-moulded in the inverted position and then moved to an upright position for filling.

In another aspect of the invention there is provided a method of making plastic bottles including the steps of forming a plastic bottle, moving the bottle from the location or locations whereat it was formed to a location or locations whereat it may be filled with a liquid, filling the formed bottle with a liquid, and ejecting the formed and filled bottle from the apparatus.

It is preferred that there be included a plurality of moulds for the formation of the bottles such that a bottle or bottles is or are formed in one mould set while the filling of a bottle or bottles is being carried out in another mould set. Thus, the method may provide for the formation of one bottle (or set of bottles in the one mould set) whilst another bottle (or set) is being filled, thus having two mould sets or it may provide for the sequentum formation of bottles in different mould sets whilst other mould sets carry bottles which are being filled.

The invention also provides apparatus for making bottles including at least one mould set for the blow-moulding of plastic bottles, means for blowing plastic material to shape in said mould set, means for moving the mould set from a blowing station to a filling station, means for filling the plastic bottles or bottle in said mould set with a liquid, means for ejecting the formed and filled plastic bottles from the mould set, and means for moving the mould set from that filling station to the blowing station.

I have previously devised certain machines for making plastic bottles whereby a very high rate of production can be achieved using a single die of one cavity. See U.S. Patents Nos. 2,903,740, 2,930,079 and 3,028,624. In these machines the blow-moulding machine is used with a continuous-extruding machine of the screw type. These applications are highly productive per machine and economically effective in many types of production; however, as the art of blow-moulding progresses, and the demand for the goods made thereby becomes greater, it has been found advisable to enter into the use of dies which have more than one cavity, and the use of these multi-cavity dies increases the output on the aforementioned machines. These multi-cavity dies are operated by having each cavity supplied by a separate extruding tube—that is, a tube for each cavity at the one receiving station, whereas in the single cavity die operation, one tube only is extruded at the receiving station. In the single cavity die operation, if the output is $x$ mouldings per hour then theoretically in the multi-cavity operation the output per hour is $x$ multiplied by the number of cavities—that is, for a two cavity die the output is 2x, and so on. However, in practice this theory does not hold on present known equipment, such as those provided for rectangular or pivotal motions, because as the number of cavities increases within the one die, so the die becomes heavier and more cumbersome to operate. The time taken to operate or move the die from the ejecting station to the receiving station is part of the cycle time; as this particular movement of the die is unproductive and as the increased weight of the multi-cavity die slows up this unproductive movement—as compared to single cavity movement—then the cycle becomes longer and slower and less productive per cavity as compared to the single cavity die speeds, the output is less than $x$ multiplied by the number of cavities—although in total the multi-cavity die will produce faster than the single cavity. Another factor which has a tendency to further lower the productive output from that of the theoretical output is the increasing difficulty of ejecting a plurality of articles from the multi-cavity die.

By using a system whereby the heavy multi-cavity dies are balanced during their cycles of operations the problems associated with multi-cavity die operation are greatly reduced—that is, displacement from receiving to ejecting station and return is executed with the minimum of power, momentum and inertia, and the ejecting operation is not involved but can be made to be carried out so that ejection is done in an orderly manner. The method can be used with either continuous or intermittent extrusion.

The method allows the use of a single die, of one or more cavities if so required, and/or a multiplicity of dies of one or more cavities, if so required.

The method can be so carried out that although the receiving station is at the vertical top the ejection can be effected at any point on the circumference, if orderly ejection is not required; or it can be carried out so that the aperture of the bottles is at a point 180° disposed from the receiving station, if orderly ejection is required. If orderly ejection is required, and effected, the method will allow the bottle or container to be blown, cooled and filled with its end product before ejection.

If it is not desired that the bottles or containers be filled in the same operation, the filling apparatus can be removed or shut off and normal blow moulding can be done. In this case the time used in filling is dispensed with and the machine will produce some 40% faster, whilst still ejecting in an orderly manner for automatic "pass on" to the next machine.

If orderly ejection and filling are not required, the method allows finished-article ejection at some point on the circumference further on than the 180° ejecting station. This allows faster cycling again because the unproductive die movement from ejecting station to receiving station can be brought to a minimum. It is believed for scrambled ejection, when the bottles are not being filled, the machine can be almost 40% faster in operation than it is if the bottles are being filled and ejected on to the conveyor C.

There are a number of novel features in the process and apparatus provided by this invention and in order that such features will become apparent and their advantages appreciated, I shall now describe one method or sequence of operations according to the invention and also a modified method within the scope of the invention. I also describe one particular construction of apparatus made according to the invention. It will be appreciated, however, that the invention is not limited to this construction and arrangement of the parts of the machine or the methods of operation thereof. Similarly, the sequence of operations may be altered within the framework of the invention.

In order that the invention may be clearly understood and conveniently put into practical form I shall now describe, with reference to the accompanying illustrative drawings, one preferred manner of carrying out the process of the invention as well as a construction of apparatus according to the invention. In these drawings:

FIGURES 39 and 40 show an alternative arrangement of apparatus for the ejection of formed bottles from the mould.

Initially I shall consider, and describe, the method of blow-moulding and filling bottles according to the invention as illustrated in FIGURES 1 to 24. In order to carry out the method in the manner as illustrated two moulds are provided, designated A and B in the drawings. Each of these moulds consists of two mould parts 41 and 42 provided with complementary mould cavities of desired shape, the mould parts being mounted for movement in a suitable manner as will hereinafter be described in relation to the apparatus of FIGURES 34 and 35. These moulds may have a single cavity, as illustrated, or they may be of multi-cavity type with the cavities arranged in line along the plane at right angles to the plane of the paper in FIGURE 2. (That is, they would be in line along the plane of the paper, considering FIGURE 1.)

Figures 1, 2:
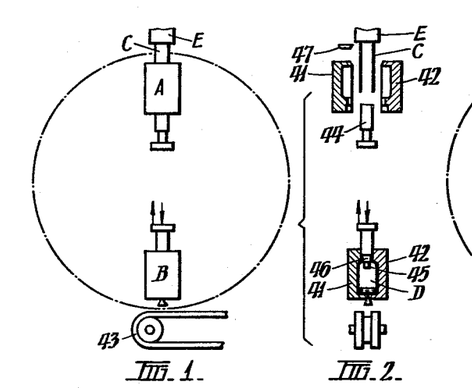
FIGURES 1 to 24 are diagrammatic illustrations of different steps or sequences in the carrying out one process according to the invention, FIGURES 1 and 2 showing in side elevation and in vertical transverse cross-section, respectively, two pairs of mould parts at a first position in the process with one pair of mould parts opened to receive between them a length of tubular material being extruded from a suitable extruder and the other pair of mould parts carrying a blow-moulded bottle which is about to be filled with a liquid; the remaining figures of these diagrammatic illustrations are in like pairs, with one figure of each pair showing the two pairs of mould parts in side elevation and the other figure showing them in vertical transverse cross-section.

The first step in the sequence of operations illustrated in these figures is that when the two moulds A and B are moved to the positions shown in FIGURES 1 and 2, when the mould A is located beneath the extrusion nozzle E of an extrusion machine, its two mould parts 41 and 42 opened apart so as to fit on opposite sides of the tubular material C being extruded, and the mounting 44 for an air inlet-outlet nozzle 45, 46 axially aligned with the parison C. The mould B is then located directly below the mould A, and at that location it carries a blow-moulded bottle D which is to be filled with liquid fed through the minor nozzle 45. Filling may commence at that position, or it could commence at about 45° before the vertical position is reached. At that stage the two moulds A and B are located the same distance from the centre of rotation of the assembly, so that they are in balanced relationship.

The next step in the sequence of operations is shown in

Figure 3:
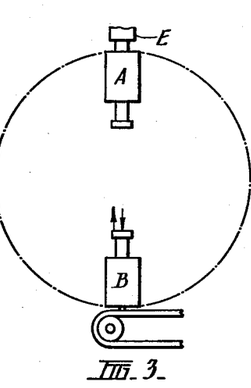
Figure 4:
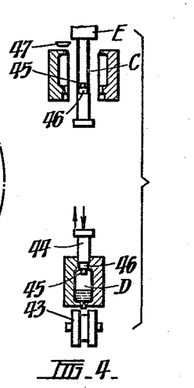
Figure 5:
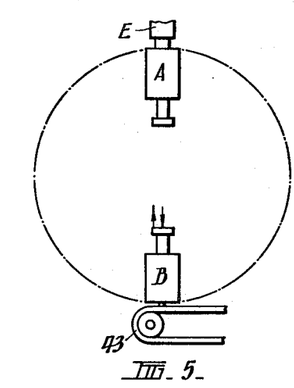
Figure 6:
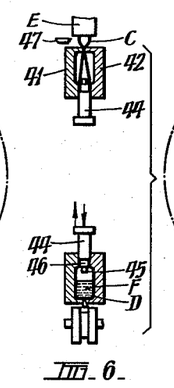
Figure 7:
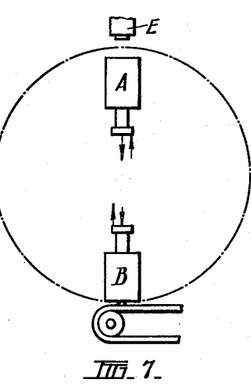
Figure 8:
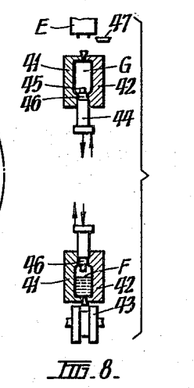
Figure 9:
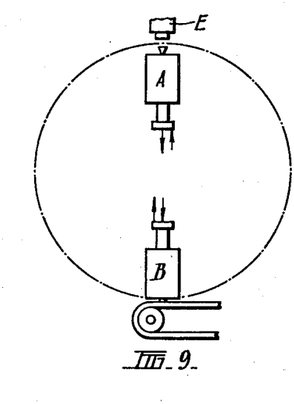

FIGURES 3 and 4. In this step the mould B is lowered radially a short distance so that its outer end is but a short distance above the conveyor 43 and liquid is then fed into the bottle D through the nozzle 45 associated with said mould B, and air is exhausted from within the bottle through the nozzle 46. Simultaneously with the radial movement of the mould B the mould A is raised radially a short distance so that its upper end is in close proximity to the extrusion nozzle E, and at the same time the nozzle 45, 46 is raised relative to the mould A so that its upper end is engaged with the lower end of the extruded tubular material C. Then, in the next step, the two moulds A and B remaining in the same radial positions, the two parts 41 and 42 of the mould A are closed, as shown in FIGURE 6, as to pinch the extruded tubular material C closed at the upper end of the mould A. The filling of the bottle D in mould B is continued, as indicated by the higher level of liquid F in said bottle.

Immediately the mould parts 41 and 42 of mould A are closed the cutter blade 47 located beneath the nozzle E is actuated so as to cut the extruded material C beneath the nozzle E and the mould A is moved radially away from the extrusion nozzle E so that extrusion can continue. At the same time the blowing of air through the nozzle 46 is commenced so as to cause the extruded material C to be blown to the shape of a bottle G, the air being forced through the nozzle 46 at a pressure in excess of the operating pressure of a relief valve associated with the nozzle 45, so that air is exhausted from within the bottle G whilst still maintaining adequate pressure within it to hold it to the shape of the mould. This system provides for the passage of cooling air through the bottle G, and that passage is directed so that it moves over the inner surface of the bottle G, thus providing for a relatively rapid cooling of the bottle G. The mould parts 41, 42 are also water cooled, to assist in the cooling of the formed plastic material. During these operations the filling of the bottle D in mould B is continued, as is the extrusion of a further parison from the nozzle E.

Figure 10:
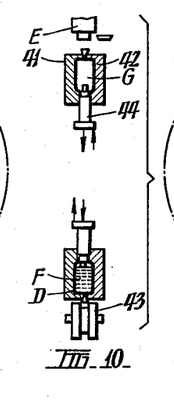
Figure 11:
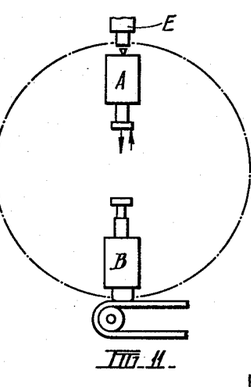
Figure 12:
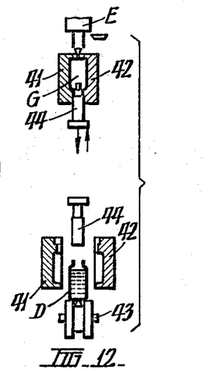
Figure 13:
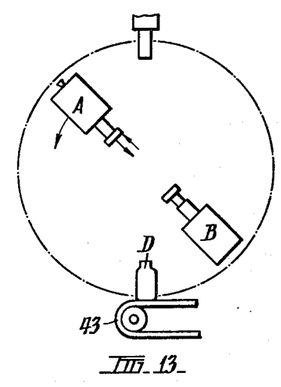
Figure 14:
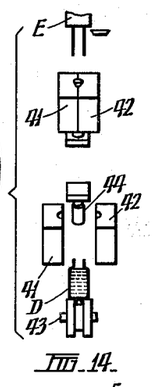
Figure 15:
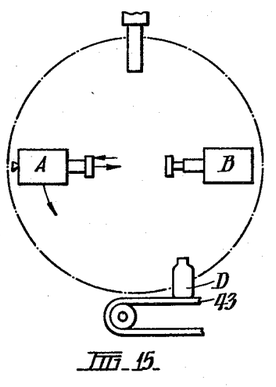
Figure 16:
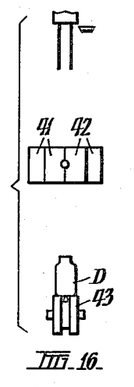

In order to cool the bottle G it is necessary to feed air through the composite nozzle 45, 46 for a time and as that cooling operation is continuing the filling of bottle D with the liquid F is completed, as shown in FIGURE 10. During the filling of the bottle D the mould B has remained at its extreme radial position, as shown in FIGURES 3, 5, 7 and 9 with the outer end but a short distance above the conveyor 43. However, when the filling operation has been completed the two parts of the mould B are opened so as to permit the filled bottle to drop a short distance onto the conveyor 43 and then moved radially inwards so as to be clear of the conveyor and also in balance with the mould A—see FIGURES 11 and 12. At the same time as the mould parts 41, 42 are opened the nozzle 45, 46 is retracted within its mounting 44 so that there will be no tendency for the filled bottle D to be suspended from said nozzle 45, 46.

Figure 17:
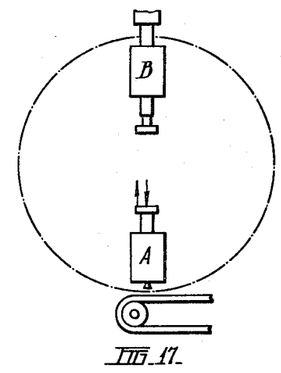
Figure 18:
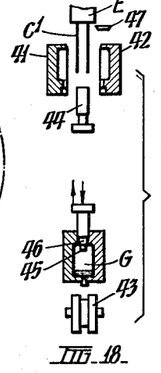
Figure 19:
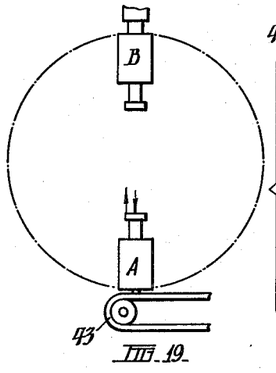
Figure 20:
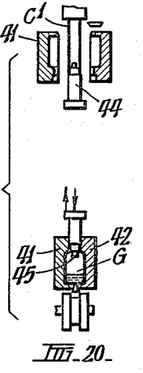
Figure 21:
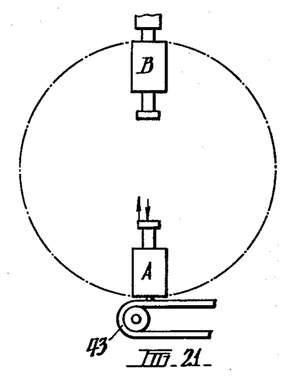
Figure 22:
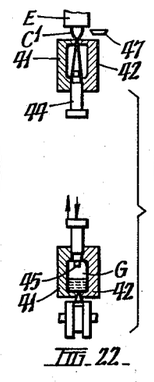
Figure 23:
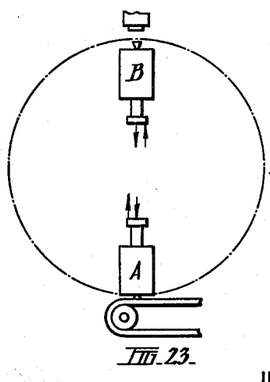
Figure 24:
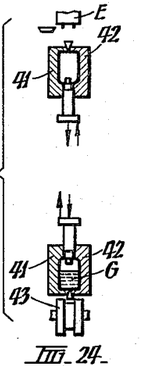

The next step in the sequence of operations is the movement of the mould A from the "blowing" station, as illustrated in FIGURES 1 to 12, to the "bottle-filling" station, and the movement of the mould B from the "bottle-filling" station to the "blowing" station, such movement being illustrated in FIGURES 13 to 18. In that movement the cooling of the bottle G is continued as the mould A travels from the "blowing" station to the "filling" station but the mould B travels empty, and open, to the "blowing" station. When the mould B reaches the "blowing" station—as shown in FIGURES 17 and 18—it is in the same condition as was the mould A as shown in FIGURES 1 and 2, and the mould A at the "filling" station shown in FIGURES 17 and 18 is in the same condition as shown in relation to the mould B in FIGURES 1 and 2—the mould B being ready to receive the parison C' and the bottle G in mould A being ready to be filled with liquid. Thus, FIGURES 17 and 18 show the same relative dispositions of the parts as FIGURES 1 and 2 save that the moulds A and B are reversed, and the succeeding FIGURES 19 and 20 show the same step in the sequence of operations as that shown in FIGURES 3 and 4, FIGURES 21 and 22 show the same operation as do FIGURES 5 and 6, and FIGURES 23 and 24 show the same operation as do FIGURES 7 and 8 save that, in each case, the moulds A and B are reversed.

That is to say, the parison C' is enclosed in the mould B and blown to shape in the same manner and with the same sequence of operations as described above, and the bottle G in the mould A is filled in the same manner ready to be deposited on the conveyor 43 as described in relation to the bottle D in mould B.

The filled bottles are deposited from the moulds B and A in sequence on the conveyor 43 by which they are carried to a suitable station for application of closures and finishing—labelling and so on—in any suitable manner.

In order that there will be no dripping of liquid from the nozzle 45 the internal surface thereof is coated with polytetrafluoroethylene which is substantially un-wettable or, alternatively, the tube itself is made of that material. Therefore, there should be no liquid adhering to the walls of said nozzle 45 after the liquid has been fed through the nozzle.

The radial movement of the moulds to a position close to the extrusion nozzle E prior to the closing of the moulds to grip the parison C ensures that there is a minimum of "tail" after cutting of the material by the cutter blade 47, and the corresponding movement to position the filled bottle close to the conveyor 43 allows correct positioning of the bottles on the conveyor 43 to reduce substantially likelihood of the contents spilling.

The radial travel of the moulds A and B is adjustable so that only a minimum of travel takes place. There must be sufficient clearance between the top of the mould and the bottom of the extrusion nozzle E to allow passage of the blade 47, and when the mould is to be moved arcuately it must be then moved radially inwards to clear the nozzle E or the conveyor 43.

If the filling of the bottles is not required it is not necessary to hold the moulds at the so-called "filling" station and the conveyor 43 is not required. Therefore, the blown and cooled bottles may be ejected at a station closer to the "blowing" station. Thus, there is a smaller degree of waste motion—the travel of a mould from one station to another without any productive work being done in the process. It will be noted that in the sequence of operations described above with reference to FIGURES 1 to 24 the travel of the moulds from the "filling" station, directly above the conveyor 43, to the "blowing" station below the extrusion nozzle E is not productive of any useful work in that the moulds are unproductive during such travel. That is due to the fact that the filled bottles, not provided with closures, are deposited in an upright position on the conveyor 43. However, if the bottles are not to be filled they may be ejected from the moulds just before the moulds reach the "blowing" station beneath the extrusion nozzle E, thereby substantially reducing such unproductive travel.

This is illustrated in FIGURES 25 to 30.

Figure 25:
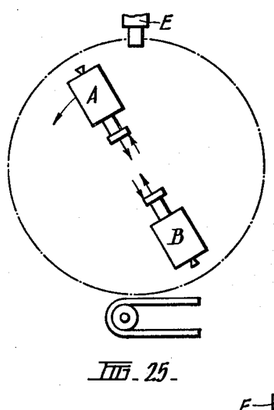
FIGURES 25 to 30 are diagrammatic illustrations of a modified process wherein the blow-moulded bottles are not filled but are ejected at a later state in the rotary movement.
Figure 26:
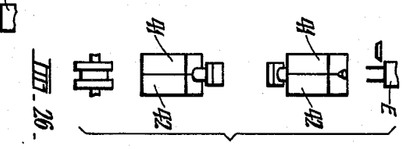
Figures 27, 28:
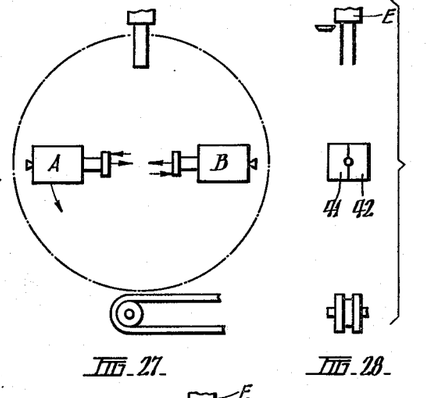
Figure 29:
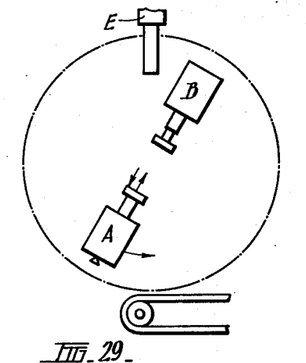
Figure 30:
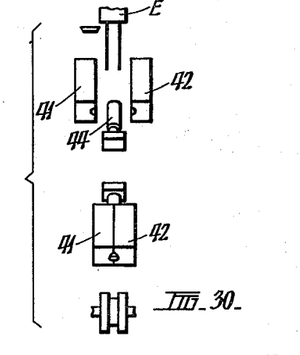

FIGURES 25 and 26 show the mould A as it moves away from the extrusion nozzle E after the bottle therein has been blown to shape. As the bottle can be retained in the mould to a later station in its rotary movement, and as the mould B does not require to be held at a "filling station," it is not necessary to hold the mould A below the nozzle E for as long a time as is necessary with the sequence of operations described above with reference to FIGURES 1 to 24. Also, the cooling operation can be carried on until the moulds reach the "ejection" station. Therefore, as shown in FIGURES 25 and 26, cooling of the bottle in mould B is continuing and, as shown in FIGURES 27 and 28, that continues as the rotation continues until the "ejection" station is reached—shown in FIGURES 29 and 30. At that position the parts 41 and 42 of the mould B are opened and the bottle ejected therefrom.

Figure 31:
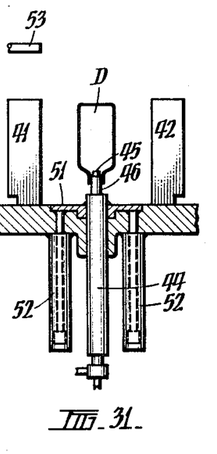
FIGURES 31, 32 and 33 are diagrammatic illustrations of one form of apparatus for ejecting the formed bottles from a mould.
Figure 32:
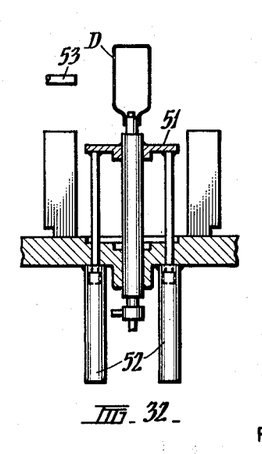
Figure 33:
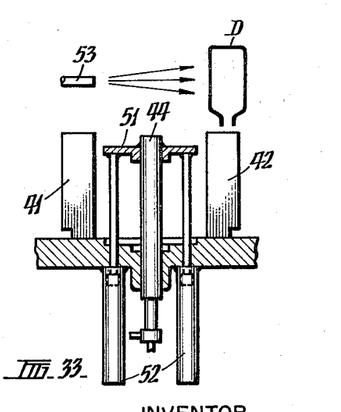

The ejection may be done merely by opening the mould parts 41 and 42 and allowing the bottle to be forced off the outer nozzle 46 by the pressure of air. Alternatively, as shown in FIGURES 31 to 33, the ejection may be done by a stripper plate. As can be seen from these figures of the drawings, when the mould parts 41, 42 are opened (the supply of air under pressure through the nozzle 46 being shut off) the stripper plate 51 is moved outwardly by the pneumatic rams 52 until the bottle D is clear of the mould B, when the nozzle 45, 46 is extruded to a position level with the mounting 44, and then the bottle is ejected sideways by a blast of air from a nozzle 53 provided at the appropriate location for that purpose, there being provided a suitable control valve for the nozzle 53 adapted to be actuated and opened when the stripper plate 51 reaches the outermost position and the nozzle 46 retracted.

It is also to be noted that if filling of the bottles is not required—when it is not necessary to move the filled bottle downwardly to deposit it relatively gently on the conveyor 43—the linear or radial movement of the bottles is not necessary. Therefore, the moulds may be kept in balance the whole time without any such linear movement.

The reduction of waste or lost time in the blowing and filling of the bottles may also be effected by a horizontal extrusion of the tubular material towards the mould locations so that instead of the "blowing" station being 180° in advance of the filling station it may be, say, 90° in advance of the "filling" station in an anti-clockwise direction. Considering the direction of rotation as being that shown in FIGURES 1 to 24. In such an arrangement four moulds could be provided with mould A′ being at the "blowing" station at a particular time and mould D′ being at the "filling" station, moulds B′ and C′ being then at stations 90° apart and equally spaced between the "blowing" station and "filling" station. Or there may be provided three mould sets spaced 120° apart about the centre of rotation, with the extrusion of the parison being effected at an angle of 60° to the horizontal.

In this balanced two-mould method the output for two single cavity moulds—in the case where the bottles are being filled—is not twice the output of one similar single cavity mould used in a straight rectangular or pivotal motion, although it is greater than the fastest output of the single cavity mould using rectangular motion, but it has several features that are unobtainable in the simpler rectangular motion or pivotal motion.

In rectangular motion, displacement from the receiving station to the ejecting station is usually in a straight line. Then, the longer the article being blown, the longer the distance the closed mould has to be displaced, and the further the mould has to travel from receiving to ejecting station; further to this, the longer the article the heavier the mould, and these two factors—distance to be displaced plus weight to be displaced—lengthened the time required to move the mould from ejecting station to receiving station. As this time is unproductive it can lengthen the cycle and reduce the output.

In the method I have just disclosed, the length of the article and the weight of the mould have far less effect on the time of displacement than if the same moulds were used in a rectangular motion. The distance of radial travel is not affected by article length, the weight of moulds is balanced, and the actual displacement is done at a slow speed within the productive time of the opposite or other cycles.

A further advantage is the ability to obtain orderly ejection if required, or scrambled ejection if filling is not required.

Further to these, the method of cycle timing can be done in methods other than that shown; this will usually depend on the final requirements of the method.

In an assembly having two moulds at 180° spacing, a reciprocating semi-rotary motion can be used and this will simplify the feeding in of the various services such as cooling water, blowing air, electricity and so on.

Although two moulds at 180° are shown it is also possible to use a greater multiplicity of moulds—for example, four moulds at 90° spacing. Where more than two moulds are used, 360° interrupted motion is required with a more complicated entry of the necessary services.

Where a particular bottle may be made (but not filled) at, say, 400 per hour with a single cavity, single mould machine using rectangular motion by the method of this invention the same bottle could be made and filled, with orderly ejection—using two single cavity moulds displaced 180°—at about 400 per hour for the two moulds. If two cavities per mould are used the output would be 800 per hour of the filled bottles. When the bottles are not filled, but ejected in orderly manner onto the conveyor 43, the rate of production would be increased by about 50%, it is believed. With scrambled ejection the rate would be increased by about 100% using two moulds—that is, to about 800 per hour for single cavity moulds.

Reference is now made to FIGURES 34 to 40 which illustrate, somewhat diagrammatically, one construction of apparatus made according to the invention.

Figure 34:
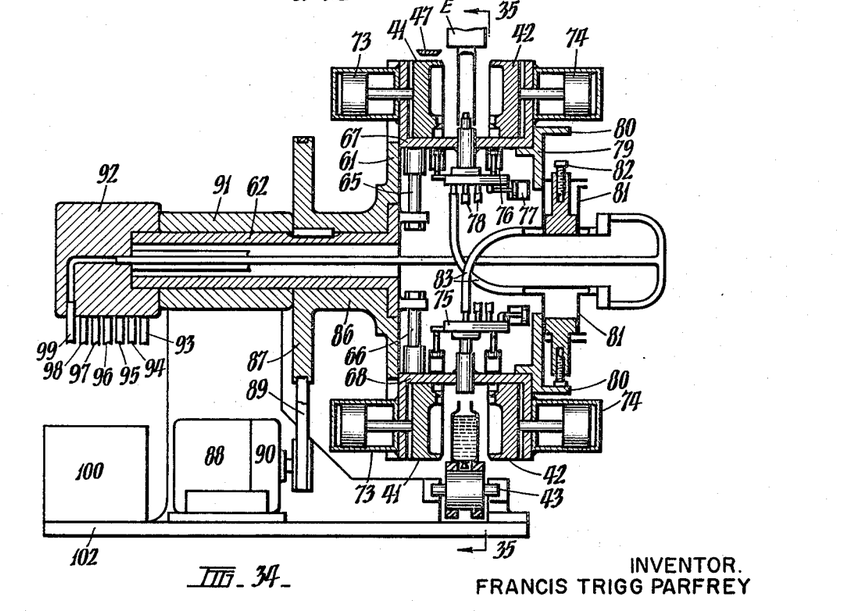
FIGURE 34 is a somewhat diagrammatic view of a machine for carrying out the method according to the invention, the view being a vertical longitudinal cross-section through the machine.
Figure 35:
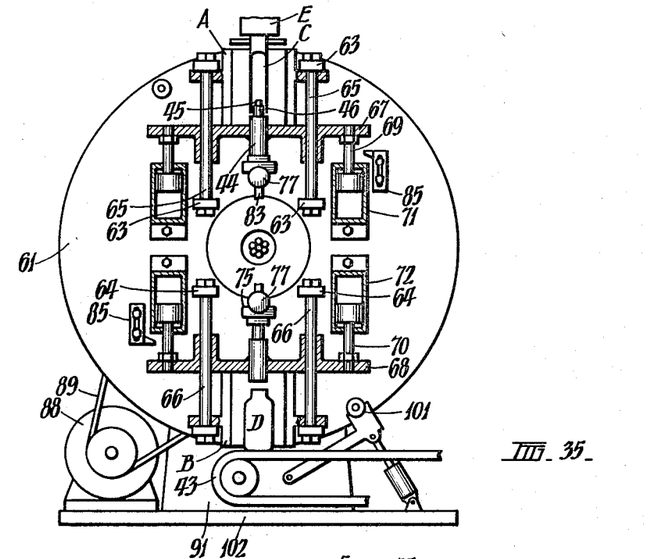
FIGURE 35 shows a transverse cross-sectional view, the cross-section being taken on the plane and in the direction indicated by the line and arrows 35—35 of FIGURE 34.

The machine has an index plate 61 mounted in a substantially vertical plane for rotation on a horizontal hollow axle 62. Mounted on the front face of the index plate 61 are two sets of brackets 63, 64 to which are rigidly secured guide rods 65, 66, respectively. Mounted for sliding movement on the rods 65, 66 are two die platforms 67, 68, respectively, operatively connected by piston rods 69, 70 to pneumatic rams 71, 72, and two pneumatic rams 73, 74 are mounted in opposed relationship on each of the platforms 67 and 68, said rams 73, 74 being connected to the two mould parts 41, 42, respectively, so as to be adapted to effect the opening and the closing of the moulds A and B. Said mould parts are mounted on the die platforms 67, 68 in any suitable manner.

Each of the die platforms 67, 68 has fastened to it, in a substantially radial position and midway between the two mould parts 41, 42 at their "in registration" position, a mounting 44 for a composite air inlet-exhaust nozzle 45, 46 and the parts are so arranged that when the nozzle mounting 44 is in an upright position it is axially aligned with the extrusion nozzle E of an extrusion machine which does not, in itself, form part of this invention. The outer nozzle 46 of each nozzle assembly is secured at its inner end to a platform 75 which is connected to a pair of pneumatic rams 76 fastened to the inner surface of the relevant die platform 67 or 68. By operation of the rams 76 the composite nozzle assemblies 45, 46 may be extended to operative position or retracted to inoperative position, as required. Also mounted on each platform 75 is a pneumatic piston-cylinder assembly 77 which is connected to a slidably-mounted change-over valve having tube connections 78. By operation of the piston 77 the change-over valve may be moved from a position at which air under pressure is fed through the nozzle 46 and exhausted through the nozzle 46 to a position at which liquid is supplied to the nozzle 45.

Each of the die platforms 67 and 68 has a bracket 79 attached to it, and on each bracket is a stop 80 and a liquid metering valve 81 having a cub-content adjustment member 82. These metering valves 81 are connected to the appropriate parts of the change-over valves 78 by flexible tubes 83. Thus, when the change-over valves are in the correct position the liquid metering valves 81 may be used to supply a correct volume of liquid through the composite nozzles 45, 46 to the bottles in the mould sets A and B when said mould sets are at the station at the bottom of the circular path of travel.

Also mounted on the index plate 61 are die platform stops 85 for limiting the radial travel of the die platforms 67 and 68, said stops 85 being adjustable so that the travel of the platforms 67, 68 may be modified to suit the plastic hollow-ware to be produced and filled.

The index plate 61 has a boss 86 provided with a belt pulley-wheel 87 to which a drive is transmitted from a reversible, variable speed motor 88 by the belt 89 and through a reduction gearbox and magnetic clutch 90. The hollow axle 62 supporting the index plate 61 and operating mechanisms is journaled in the pedestal bearing 91.

A multi-circuit rotary union 92 is mounted at the rear end of the hollow axle 62, and said union 92 has seven connections 93, 94, 95, 96, 97, 98 and 99, the first two being for the fluid for operating the mechanisms (described as being pneumatic), two being for water for the cooling of the mould parts, one being for the supply of air to the composite nozzle 45, 46, one being for the electrical leads for piloting and controlling apparatus and for other purposes, and the other being for the liquid for filling the bottles. These supply lines are all mounted within the axle 62. There is also provided an adjustable valve (not shown) for controlling the pressure of air within the moulded hollow article D after it has been blown to shape and before the change-over valve is actuated to feed liquid into the bottle.

For 360° uni-directional movement the flex connections for the electrical system are terminated in a multi-ring brush system on the end of the multi-union 92 in known manner but for a modified application of the apparatus wherein the machine is operated by a 180° pivotal movement and return the electrical connections may be effected in any other known manner.

There is also provided an air pressure supply, indicated generally at 100, and an index stop 101 is engaged with the index plate 61. The whole assembly is mounted on a base 102.

Figure 36:
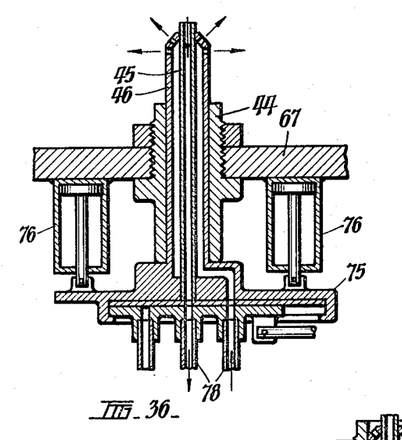
FIGURES 36 and 37 show the arrangement of a change-over valve for supplying blowing and cooling air to the plastic material and liquid for filling the formed bottle, alternately.
Figure 37:
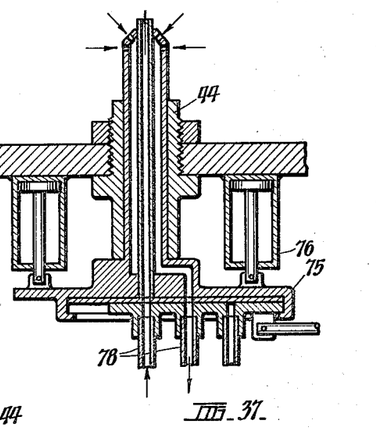
Figure 38:
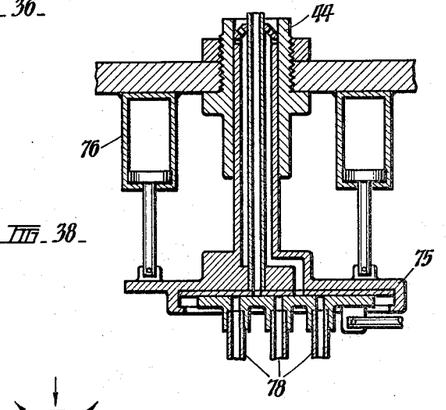

The change-over valve and mandrel assembly is illustrated in FIGURES 36, 37 and 38, FIGURE 36 showing the position of the change-over valve for the blowing and cooling of the bottle with air being supplied to the outer nozzle 46 and exhausted through the inner nozzle 45. FIGURE 37 shows the position of the parts of the change-over valve for the supply of liquid to the interior of a bottle (though the inner nozzle 45, with air exhaust through the outer nozzle 46), it being understood, of course, that the filling of the bottle is done when the bottle is right-way up, when this assembly will be in the inverted position with the nozzles 45, 46 directed downwardly. FIGURE 38 shows the change-over valve in a neutral position, with the connections 78 not in communication with the passages leading to the nozzles 45, 46. This figure also shows the platform 75 moved away from the die platform 67 by the pneumatic rams 76 so that the nozzles 45, 46 are retracted fully within the mounting 44, when a blown (and/or filled) bottle would be unsupported by the nozzles and thereby disengaged from the apparatus ready for ejection.

Figure 39:
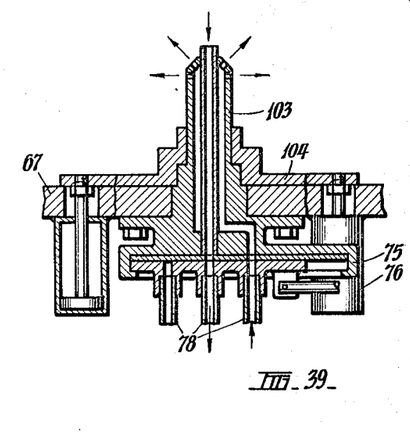
FIGURE 39 shows the mandrel assembly in the position for bottle ejection, and the change-over valve in an inoperative or neutral position.
Figure 40:
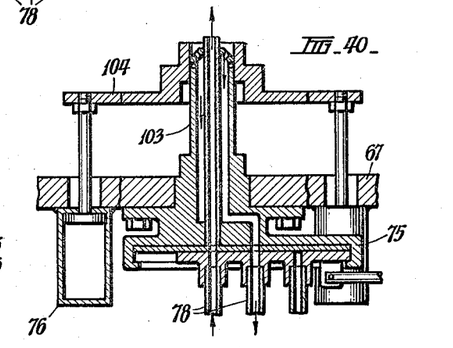

Instead of having the mandrel assembly movable relative to the die platform 67 there may be provided a die platform having the mandrel assembly secured in fixed position relative thereto, and a stripper plate for effecting ejection of the formed hollow article. The apparatus depicted in these views has a fixed mandrel assembly 103 and a stripper plate 104 operatively connected to the pneumatic rams 76 in such manner that when the rams are actuated the stripper plate 104 is fixed outwardly to push a formed bottle off the mandrel assembly 103, as clearly illustrated in FIGURE 40.

It will be readily appreciated from the foregoing description that the method of and apparatus for moulding plastic hollow-ware is extremely flexible in that the apparatus may be operated on a uni-directional system of 360° rotation for each complete sequence of operations, or it may be operated on a 180° oscillatory system with the mould A moving in an anti-clockwise direction down to the ejection station, where it is shown in FIGURES 17 to 24, and then being returned in the opposite direction to the extrusion-reception position as shown in FIGURES 1 to 12, the mould B at the same time travelling from the ejection station to the extrusion-reception station and then returning in clockwise direction to the ejection station.

Also, the apparatus may have four mould sets, instead of the two illustrated.

If desired, a multi-cavity arrangement of moulds can be used, with each of the mould sets having more than one mould cavity, and there may be provided a multi-mould arrangement with multi-cavity moulds—as a four-mould system with each mould set having, say, three cavities.

The apparatus may be used for making the bottles and filling them with a desired liquid before ejecting the bottles—when the bottles are filled in the vertical position with neck uppermost, and ejected in that upright position onto a suitable conveyor—or by eliminating the filling operation the bottles may be formed and cooled, and ejected at a later stage in the travel of the mould, so as to provide for a very high rate of production.

It is believed that by the use of the method and apparatus briefly described above there will be achieved a substantial reduction in the delaying factors which cause a reduction in the effective practical production rate below the theoretical, as explained at the outset in this specification.

What I claim is:

1. In a method of making plastic bottles the steps of clamping a length of tubular plastic material in a first mould having at least one mould cavity, simultaneously feeding a quantity of liquid into a formed hollow article held in a second mould, blowing to shape the plastic material in said first mould and moving that mould radially inwards whilst continuing the filling of the formed hollow article in said second mould, ejecting said formed hollow article from the second mould and moving the two moulds in complementary arcuate paths whereby said first mould is moved to the filling station of the second mould and said second mould is moved to the plastic receiving station of the first mould.

2. In a method of making and filling plastic bottles by use of at least two moulds disposed at arcuately spaced intervals the steps of extruding a length of tubular plastic material from the extrusion nozzle of a plastic extruder, clamping that length of plastic material in a first mould, moving the mould linearly away from the extrusion nozzle, blowing the plastic material to the shape of the mould cavity, cooling the formed hollow article, simultaneously feeding a quantity of liquid into a formed bottle in a second mould, discharging the filled bottle from said second mould, and moving the two moulds simultaneously in the same arcuate direction so that their positions are reversed.

3. In a method of making and filling plastic bottles the steps as claimed in claim 2 wherein the step of filling the bottle in the second mould commences during arcuate travel of said second mould prior to that mould being moved to the position whereat the filled hollow article is discharged.

4. In a method of making and filling plastic bottles the steps as claimed in claim 2 wherein the extrusion is continuous.

5. In a method of making and filling plastic bottles the steps as claimed in claim 2 wherein the one nozzle assembly is used for the blowing of the tubular material to shape and the filling of the bottle thus formed.

6. In a method of making and filling plastic bottles the steps as claimed in claim 2 wherein the tubular plastic material is extruded downwardly, and the formed bottle in said second mould is filled whilst in an upright position and discharged on to a conveyor when in that position.

7. In a method of making and filling plastic bottles the steps as claimed in claim 2 wherein the at least two moulds are held at substantially the same radial spacing from the axis of rotation during the arcuate movements thereof.

8. In a method of making plastic hollow-ware by use of at least two moulds disposed at arcuately spaced locations the steps of moving a first mould to a position to receive a length of tubular plastic material and simultaneously moving to a position diametrically opposed thereto a second mould having within it a formed hollow article, moving both moulds radially outwards, clamping said first mould about a length of tubular plastic material, blowing said plastic material to the internal shape of the mould, moving both moulds radially inwards to an inbalance position, and moving the two moulds simultaneously in the same arcuate direction so that their positions are reversed.

9. In a method of making plastic hollow-ware the steps as set out in claim 8 wherein said formed hollow article in said second mould is filled with liquid whilst said second mould is in the first of its said positions.

10. A method for forming and filling a container comprising: periodically moving in carousel fashion a series of partible moulds along a closed path of travel between a receiving station and a filling station, said moulds being positioned with respect to each other along said closed path substantially in balanced relation, providing at said receiving station a continuous deformable parison, engaging hollow mandrel means with the leading end of the parison and enclosing a partible mould about a length of the parison and said mandrel means in such manner as to sever the enclosed length from the continuous parison, passing a fluid through one longitudinal section of the mandrel means into the parison length and withdrawing the fluid from the parison through another longitudinal section of the mandrel means at a sufficient rate differential and for a sufficient time to blow the parison length to the shape of the mould to form a container and to cool the container, moving the partible mould and mandrel to the filling station at any time subsequent to enclosing the mould about the mandrel, filling the container within the mould at said filling station through one longitudinal section of the hollow mandrel means, venting any fluid displaced from the container by the filling through another longitudinal section of the mandrel, and releasing the shaped and at least partially filled container from its partible mould.

11. In a method of forming hollow plastic articles by use of at least two moulds disposed at substantially arcuately spaced intervals, the steps of moving a first mould to a position adjacent a supply of hollow plastic material, clamping said first mould about a length of said material, moving said first mould radially away from said supply, forcing gas into said length so as to form it to the shape of the mould, moving the first mould substantially arcuately, generally simultaneously therewith moving at least a second mould in the same general arcuate direction and toward said supply of plastic material, said at least second mould having in it a formed hollow article, cooling the formed hollow articles in said moulds at least during the movements thereof, removing the article from said second mould before said second mould reaches a position adjacent said supply of plastic material while continuing the cooling of the formed article in said first mould, said at least two moulds being held substantially in balance about an axis of rotation of their substantially arcuate movements.

12. A method for forming hollow plastic articles at an increased rate of output comprising: periodically moving a series of moulds along a closed substantially arcuate path of travel and past a receiving station, said moulds being positioned with respect to each other along said closed path substantially in balanced relation, providing at said receiving station a deformable parison, moving a mould relatively from said path of travel at said receiving station and into engagement with said parison in such a manner as to sever a length from the parison, blowing said length of parison to the shape of the mould to form a hollow article, cooling said article at least while the mould continues its movement along said path, and removing the blown and cooled article from said mould prior to its return to said receiving station, whereby said articles may be cooled throughout a substantial portion of the entire path of travel from said receiving station back to the receiving station.

13. A method for forming and filling hollow plastic articles comprising: periodically moving a plurality of moulds sequentially along a closed path of travel extending from a receiving station to a filling station and back to a receiving station, said moulds being positioned with respect to each other along said closed path substantially in balanced relation providing a deformable parison of plastic material at said receiving station, providing filling means at said filling station, moving a mould at said receiving station relatively from said path of travel and into engagement with said parison in such manner as to sever a length from the parison, blowing said parison length substantially to the shape of said mould to form an article, cooling the article prior to its reaching the filling station, moving said mould at said filling station relatively from said path and into operative engagement with said filling means at least partially to fill said cooled article, and then removing the blown and at least partially filled article from said mould, one of said plurality of moulds being at said receiving station substantially at the same time that another of said plurality of moulds is at the filling station.

14. In a machine for forming plastic hollow-ware a support for at least two mould sets, said support being mounted for rotational movement about a substantially horizontal axis, at least two mould sets mounted on said support at equally spaced angular positions, means for moving the mould sets radially outwardly and inwardly on the support, means for rotating the support, means for maintaining the mould sets in balanced arrangement during the rotation of the support, means for opening and closing the die sets independently, means for blowing air under pressure into a tubular length of plastic material when clamped in a mould set and means for feeding liquid to the interior of a formed hollow article in a mould set, said air blowing means and liquid feeding means being adapted to operate alternately whereby liquid will be fed into a hollow article which has been blown to shape.

15. Apparatus for blowing hollow plastic articles at an increased rate of output, comprising: discharge means adapted to release a parison of plastic material adapted to be deformed, at least two moulds disposed at substantially arcuately spaced intervals and mounted to travel a closed generally arcuate path from the discharge means through a cooling zone and back to said discharge means, said at least two moulds being substantially uniformly spaced along said closed path in balanced relation, means to move a mould relatively from said path and into engagement with the released hollow parison at said discharge means in such a manner as to receive therein a severed length of the parison, means to expand the severed length to the form of each mould and produce a hollow article, means moving said at least two moulds substantially in unison along said closed path, means to cool the hollow articles operative at least while said moulds are so moving, and means to eject a formed and cooled hollow article from each mould at a point adjacent the return of the mould to the discharge means, whereby substantially the entire length of said closed path is available for cooling the hollow articles, and the rate of movement of the moulds along said path can be commensurately increased to augment the output of hollow articles from said apparatus.

16. In apparatus for forming hollow plastic articles, at least two moulds disposed in substantially angularly spaced arrangement and mounted to travel a closed generally arcuate path, means for moving said moulds along said closed path substantially in balanced relation, means for moving the moulds relatively from said closed path and into operative engagement with blowing and filling means, means for opening and closing the moulds independently, means at one position along said closed path for blowing a length of hollow plastic material substantially to the shape of a mould, and filling means at another position in said closed path for supplying liquid to the blown shape of each mould.

References Cited

UNITED STATES PATENTS

| | | | |
|---|---|---|---|
| 2,784,452 | 3/1957 | Ruekberg et al. | 18—5 |
| 2,819,490 | 1/1958 | Froot | 18—5 |
| 2,958,171 | 11/1960 | Deckers. | |
| 3,005,231 | 10/1961 | Pechthold | 18—5 |
| 3,016,669 | 1/1962 | Grosselaude | 18—5 |
| 3,162,706 | 12/1964 | Cheney | 264—97 |

FOREIGN PATENTS

| | | |
|---|---|---|
| 1,232,702 | 10/1960 | France. |
| 1,314,966 | 12/1962 | France. |

ROBERT F. WHITE, *Primary Examiner.*

A. R. NOE, *Assistant Examiner.*